United States Patent
Oketani et al.

(10) Patent No.: US 10,302,136 B2
(45) Date of Patent: May 28, 2019

(54) MOTOR AND METHOD FOR PRODUCING THE SAME

(71) Applicants: Mitsubishi Electric Corporation, Tokyo (JP); Mitsubishi Electric Home Appliance Co., Ltd., Fukaya-shi, Saitama (JP)

(72) Inventors: Naohiro Oketani, Tokyo (JP); Satoshi Hakoda, Tokyo (JP); Mamoru Hayatsu, Saitama (JP); Takehiko Ajima, Saitama (JP); Mitsumasa Hamazaki, Saitama (JP); Yuta Takahashi, Saitama (JP)

(73) Assignees: Mitsubishi Electric Corporation, Tokyo (JP); Mitsubishi Electric Home Appliance Co., Ltd., Fukaya-shi, Saitama (JP)

( * ) Notice: Subject to any disclaimer, the term of this patent is extended or adjusted under 35 U.S.C. 154(b) by 0 days.

(21) Appl. No.: 15/758,064

(22) PCT Filed: Nov. 4, 2015

(86) PCT No.: PCT/JP2015/080976
§ 371 (c)(1),
(2) Date: Mar. 7, 2018

(87) PCT Pub. No.: WO2017/077585
PCT Pub. Date: May 11, 2017

(65) Prior Publication Data
US 2018/0252266 A1    Sep. 6, 2018

(51) Int. Cl.
*F16C 35/07*    (2006.01)
*H02K 5/173*    (2006.01)
(Continued)

(52) U.S. Cl.
CPC .............. *F16C 35/07* (2013.01); *F16C 19/06* (2013.01); *F16C 19/50* (2013.01); *F16C 19/546* (2013.01);
(Continued)

(58) Field of Classification Search
CPC .......... F16C 35/07; F16C 19/06; F16C 19/50; F16C 19/546; F16C 27/066; H02K 5/04; H02K 5/173; H02K 5/1732; H02K 15/14
See application file for complete search history.

(56) References Cited

U.S. PATENT DOCUMENTS 3,214,224 A * 10/1965 Lash ...................... F16C 35/077
                                                                    384/513
6,849,977 B2 *  2/2005 Walther ................ F16C 25/083
                                                                     310/90
(Continued)

FOREIGN PATENT DOCUMENTS

JP    S56-83971 U    7/1981
JP    S60-154622 U    10/1985
(Continued)

OTHER PUBLICATIONS

International Search Report of the International Searching Authority dated Feb. 2, 2016 for the corresponding international application No. PCT/JP2015/080976 (and English translation).
(Continued)

*Primary Examiner* — Thomas R Hannon
(74) *Attorney, Agent, or Firm* — Posz Law Group, PLC

(57) ABSTRACT

A motor includes a frame including a first bearing holder, a stator, a first bearing held in the first bearing holder, a rotor rotatably supported by the first bearing, and a preload member generating a preload in a direction of an axis line of the rotor. The frame further includes a first frame part. The first frame part includes a support part supporting the
(Continued)

preload member. An outer end part of the preload member faces the support part so as to be covered with the support part.

14 Claims, 13 Drawing Sheets

(51) Int. Cl.
*F16C 19/50* (2006.01)
*H02K 5/04* (2006.01)
*H02K 15/14* (2006.01)
*F16C 19/06* (2006.01)
*F16C 27/06* (2006.01)
*F16C 19/54* (2006.01)

(52) U.S. Cl.
CPC ............ *F16C 27/066* (2013.01); *H02K 5/04* (2013.01); *H02K 5/173* (2013.01); *H02K 5/1732* (2013.01); *H02K 15/14* (2013.01); *F16C 2229/00* (2013.01); *H02K 2205/03* (2013.01)

(56) References Cited

U.S. PATENT DOCUMENTS

| | | | |
|---|---|---|---|
| 7,750,518 B1* | 7/2010 | Perkins | F16C 25/08 |
| | | | 310/89 |
| 8,294,311 B2* | 10/2012 | Miyoshi | F16C 35/067 |
| | | | 310/156.01 |
| 2009/0121570 A1 | 5/2009 | Nishikawa et al. | |

FOREIGN PATENT DOCUMENTS

| | | |
|---|---|---|
| JP | H02-103760 U | 8/1990 |
| JP | H04-17652 U | 2/1992 |
| JP | H05-244746 A | 9/1993 |
| JP | H06-038438 A | 2/1994 |
| JP | 09-140082 A | 5/1997 |
| JP | 2582035 Y | 7/1998 |
| JP | H11-252890 A | 9/1999 |
| JP | 2009-124785 A | 6/2009 |

OTHER PUBLICATIONS

Office action dated Sep. 11, 2018 issued in the corresponding JP patent application No. 2017-548549 (and English machine translation thereof).

* cited by examiner

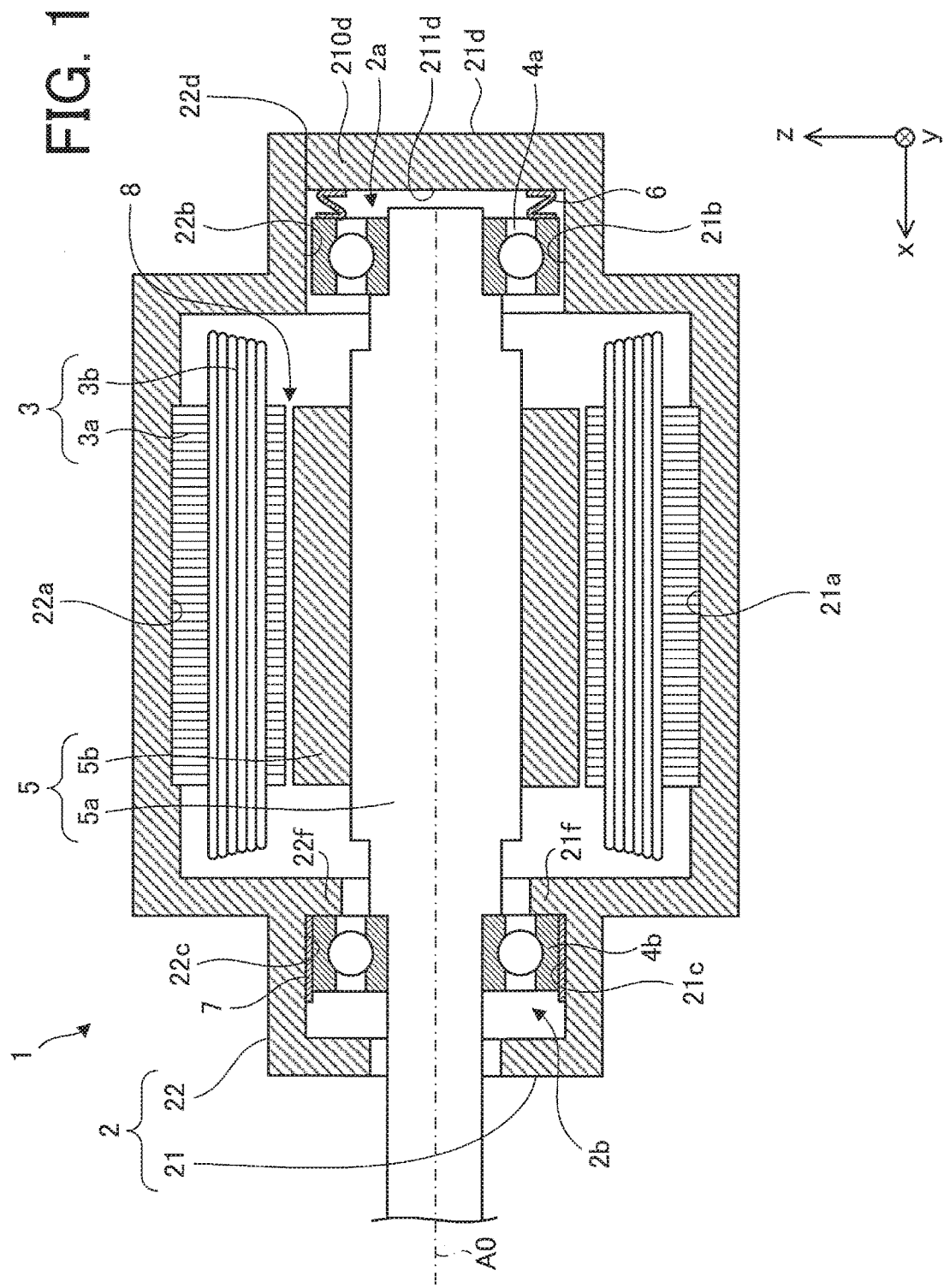

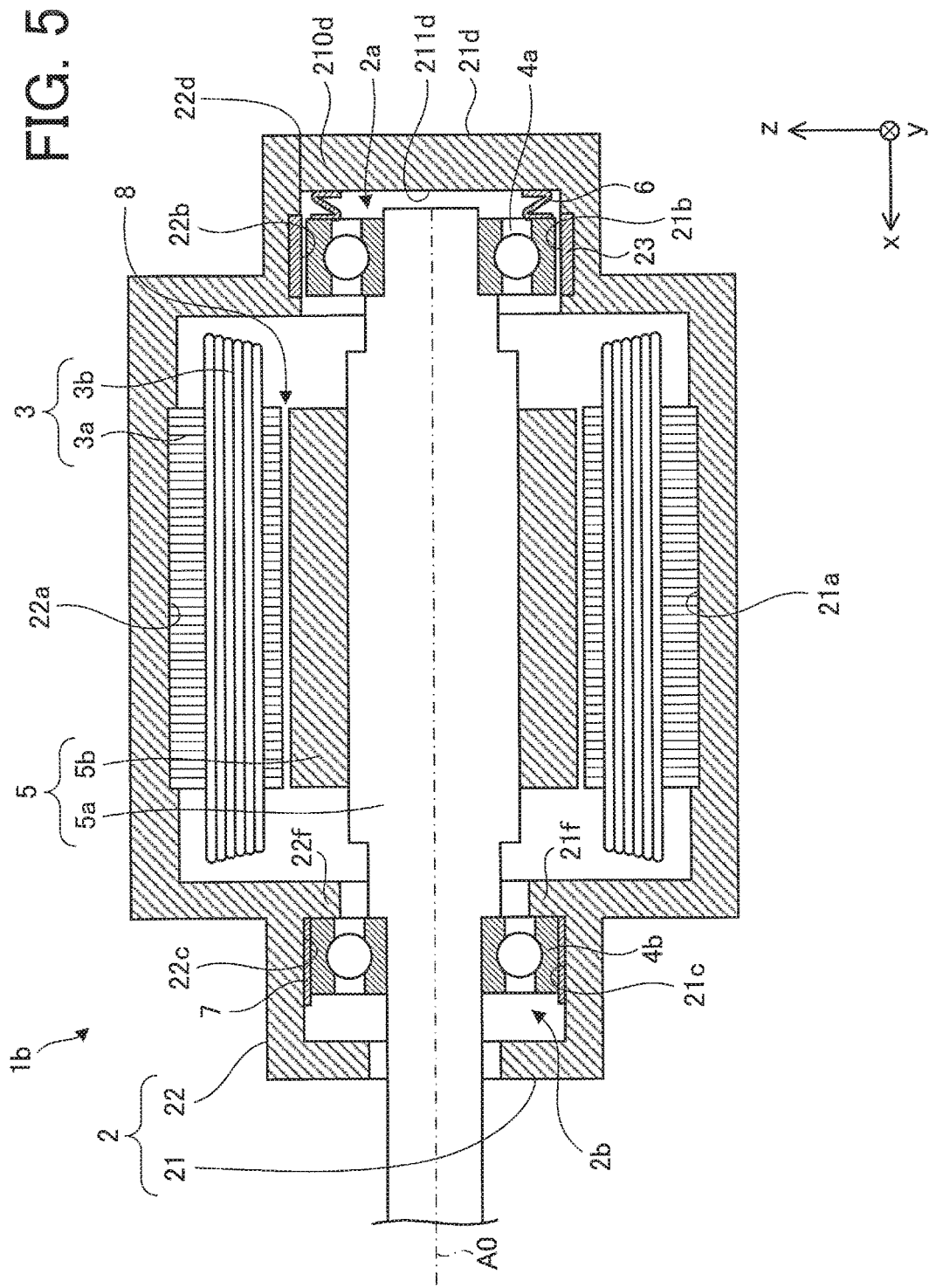

MOTOR AND METHOD FOR PRODUCING THE SAME

CROSS REFERENCE TO RELATED APPLICATION

This application is a U.S. national stage application of International Patent Application No. PCT/JP2015/080976 filed on Nov. 4, 2015, the disclosure of which is incorporated herein by reference.

TECHNICAL FIELD

The present invention relates to a motor including a stator and a rotor.

BACKGROUND ART

Generally, a motor (for example, an inner-rotor-type motor) including a frame, a bearing contained inside the frame, a rotor, and a stator is used. A cylindrical frame normally used in such a motor is formed by two frame parts into which the frame is divided in such a manner that each of the frame parts includes a surface perpendicular to an axis line direction of the motor in a substantially central part in the axis line direction of the motor. Each frame part of this cylindrical frame includes a bearing holder holding a bearing and a stator fitting part into which a stator is fitted. However, depending on the assembly accuracy of the frame or the processing accuracy of the bearing holders and the stator fitting parts in the each frame part, eccentricity, inclination, or the like of the rotor with respect to the stator in the motor could occur, and this could cause vibration during driving of the motor. Thus, it is demanded that the concentricity of the rotor with respect to the stator be improved, and there is proposed a motor configured to contain the bearing, the rotor, and the stator in its frame formed by combining a lower frame and an upper frame into which the frame is divided by a plane including the axis of the rotor (for example, see Patent Reference 1).

PATENT LITERATURE

PATENT REFERENCE 1: Japanese Utility Model Application Publication No. 04-17652

However, for example, when the frame of the motor is formed by combining a plurality of frame parts into which the frame is divided along a direction parallel to the axis line of the rotating shaft of the motor, a support part of the frame that directly or indirectly supports the rotor is usually also divided into a plurality of parts. Thus, depending on the assembly accuracy of the frame or the processing accuracy of a connection part (a division surface) of each of the plurality of divisional parts of the support part, appropriate concentricity of the rotor with respect to the stator could not be obtained.

SUMMARY

Thus, an object of the present invention is to improve the concentricity of a rotor with respect to a stator of a motor.

A motor according to the present invention includes a frame including a first bearing holder, a stator fixed to the frame, a first bearing held in the first bearing holder, a rotor rotatably supported by the first bearing, and a preload member generating a preload in a direction of an axis line of the rotor. The frame further includes a first frame part and a second frame part. The first frame part includes a support part supporting the preload member, and an outer end part of the preload member faces the support part so as to be covered with the support part. The second frame part includes a concave part combined with the support part.

According to the present invention, the concentricity of a rotor with respect to a stator of a motor can be improved.

BRIEF DESCRIPTION OF THE DRAWINGS

FIG. 1 is a sectional view schematically illustrating an internal structure of a motor according to an embodiment of the present invention.

FIG. 5 is a sectional view schematically illustrating still another example of the internal structure of the motor.

DETAILED DESCRIPTION

Figure 2A:
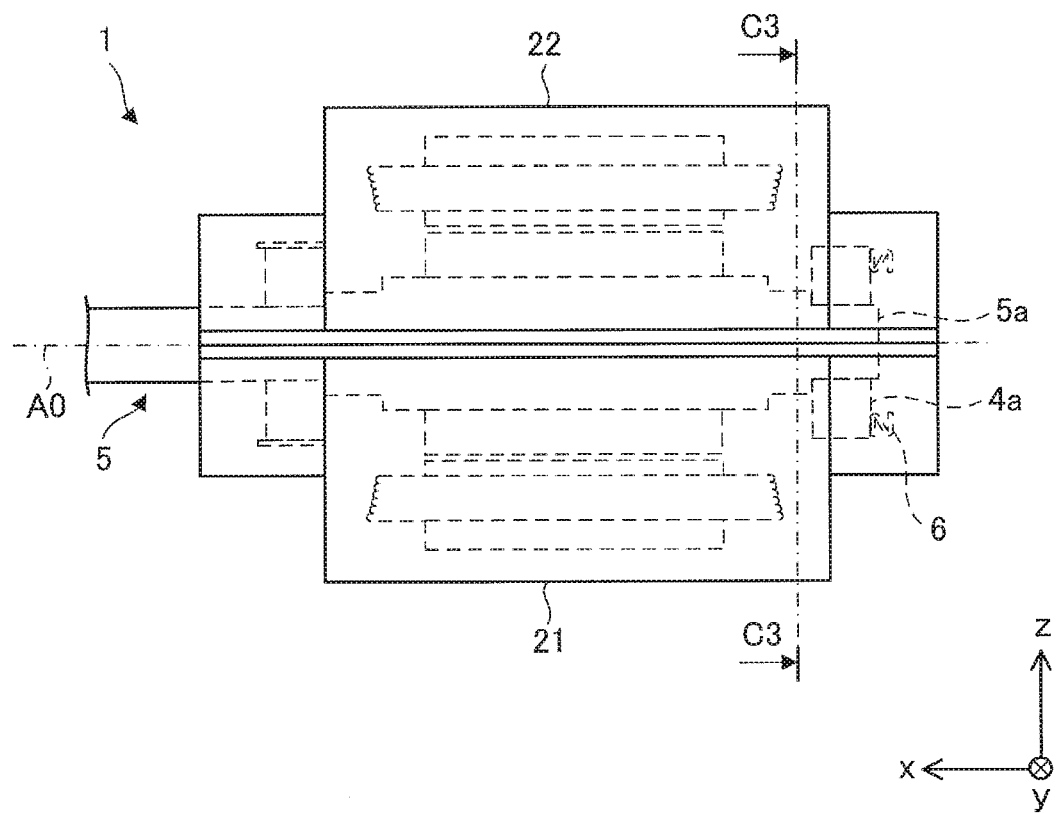
FIG. 2A is a front view schematically illustrating an external appearance of the motor.

An embodiment according to the present invention will be described with reference to the drawings. In an xyz-rectangular coordinate system illustrated in the respective drawings, the x-axis direction indicates a direction parallel to an axis line A0 of a rotor 5 of a motor 1 (hereinafter, referred to as "a direction of an axis line" or "an axis line direction"), the y-axis direction indicates a direction parallel to division surfaces (each connection surface on a first frame part 21 and a second frame part 22) of a frame 2 and perpendicular to the axis line direction, and the z-axis direction indicates a direction perpendicular to both of the x-axis direction and the y-axis direction.

FIG. 1 is a sectional view schematically illustrating an internal structure of the motor 1 according to an embodiment of the present invention.

Figure 2B:
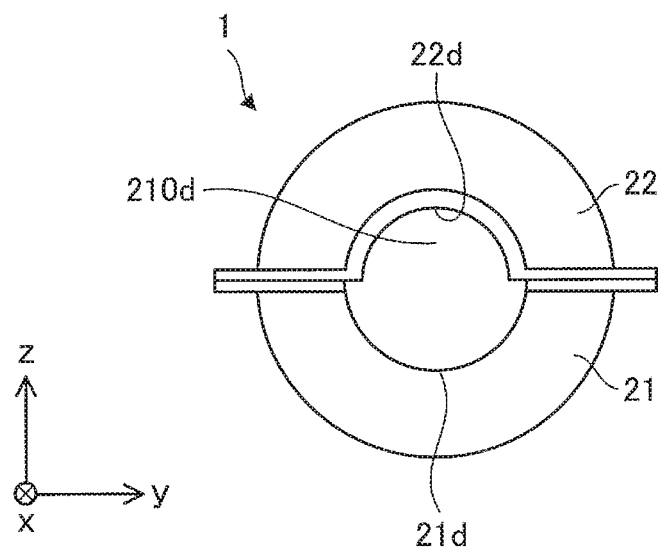
FIG. 2B is a right side view schematically illustrating the external appearance of the motor.

FIG. 2A is a front view schematically illustrating an external appearance of the motor 1. Portions indicated by dashed lines in FIG. 2A correspond to the internal structure of the motor 1 illustrated in FIG. 1. FIG. 2B is a right side view schematically illustrating the external appearance of the motor 1.

Figure 3A:
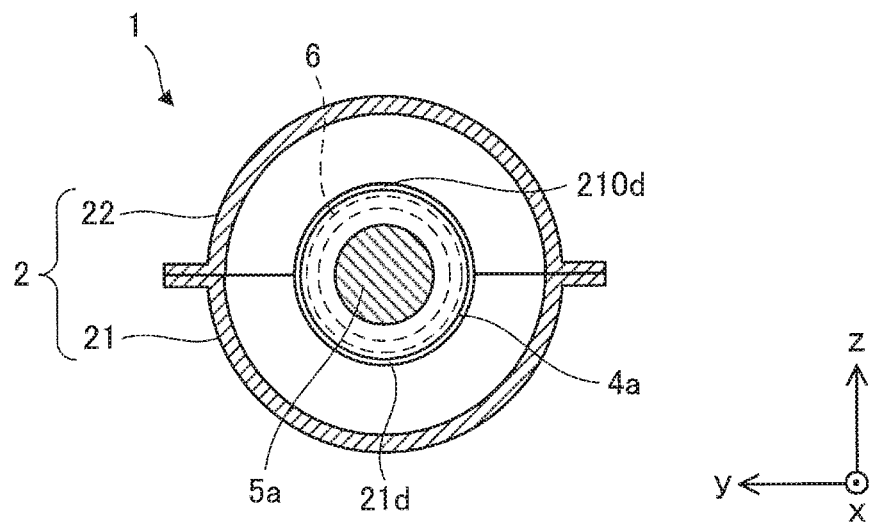
FIG. 3A is a sectional view schematically illustrating a sectional structure taken along line C3-C3 of the motor illustrated in FIG. 2A.
Figure 3B:
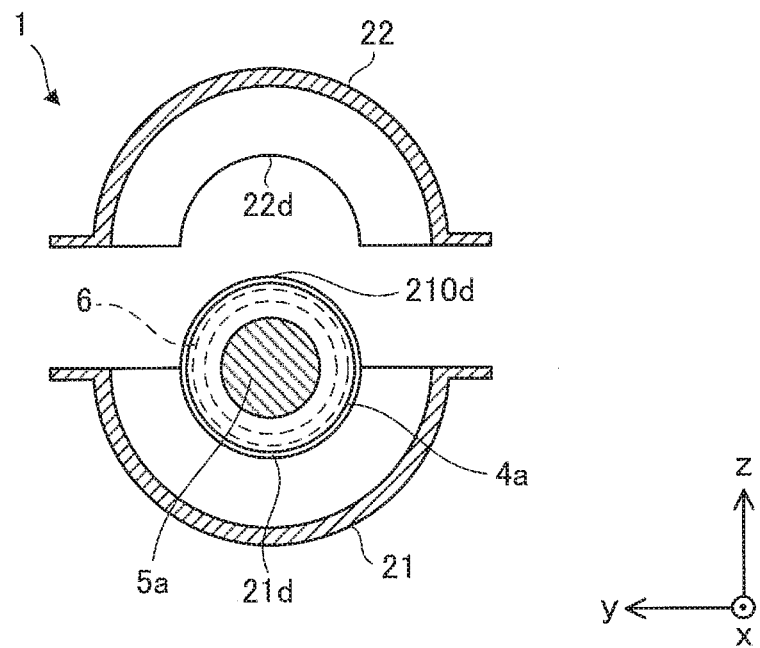
FIG. 3B is a diagram schematically illustrating a structure of the motor illustrated in FIG. 3A when a frame is disassembled.

FIG. 3A is a sectional view schematically illustrating a sectional structure taken along line C3-C3 of the motor 1 illustrated in FIG. 2A. FIG. 3B is a diagram schematically illustrating a structure of the motor 1 illustrated in FIG. 3A when the frame 2 is disassembled.

The motor 1 according to the present embodiment is, for example, an inner-rotor-type motor. The motor 1 includes the frame 2 (a housing), a stator 3, a first bearing 4a (also referred to as a "counter-load-side bearing" or a "main bearing") provided on a counter-load side of the motor 1, a second bearing 4b (also referred to as a "load-side bearing" or a "sub-bearing") provided on a load side of the motor 1, the rotor 5, and a compression spring 6 as a preload member.

The frame 2 includes the first frame part 21 (also referred to as a "base-side frame part" or a "lower-side frame part") as a base of the frame 2 and the second frame part 22 (also referred to as a "counter-base-side frame part" or an "upper-side frame part") provided on a counter-base side of the frame 2. The first frame part 21 and the second frame part 22 are fixed to each other by adhesion, screw fastening, welding, or the like. As illustrated in FIG. 2, for example, the frame 2 is formed into a cylindrical shape with a bottom by combining a plurality of frame parts into which the frame 2 is divided along a direction parallel to the axis line A0 of the rotor 5. Specifically, the frame 2 is formed by combining two parts (namely, the first frame part 21 and the second frame part 22) into which the frame 2 is divided by a plane including the axis line A0 of the rotor 5 (except a portion of a support part 21d described below). In the present embodiment, while the first frame part 21 is used as the base of the frame 2, the second frame part 22 may be used as the base of the frame 2.

The frame 2 further includes a first bearing holder 2a (also referred to as a "counter-load-side bearing holder" or a "main bearing holder") provided on the counter-load side of the motor 1 and a second bearing holder 2b (also referred to as a "load-side bearing holder" or a "sub-bearing holder") provided on the load side of the motor 1. The frame 2 contains the stator 3. Specifically, the first bearing holder 2a of the frame 2 holds the counter-load side (an end part in a −x-direction) of the rotor 5 via the first bearing 4a, and the second bearing holder 2b of the frame 2 holds the load side (an end part in a +x-direction) of the rotor 5 via the second bearing 4b.

The first frame part 21 includes a stator fitting part 21a (also referred to as a "first stator fitting part", a "base-side stator fitting part", or a "lower-side stator fitting part") that fits with the stator 3, a bearing fitting part 21b that fits with the first bearing 4a, and a bearing fitting part 21c that fits with the second bearing 4b. In the present embodiment, a portion of an outer peripheral part of the stator 3 (specifically, a stator core 3a on a −z-side with respect to the axis line A0) is fitted to the stator fitting part 21a having a concave shape, the first bearing 4a on the −z-side with respect to the axis line A0 is fitted to the bearing fitting part 21b, and the second bearing 4b on the −z-side with respect to the axis line A0 is fitted to the bearing fitting part 21c.

The first frame part 21 includes the support part 21d (a bottom part) supporting the compression spring 6, on the counter-load side of the motor 1. The support part 21d includes a convex part 210d protruding toward the second frame part 22. The support part 21d is formed into a substantially circular shape on a plane (a zy-plane) perpendicular to the axis line direction. The convex part 210d is formed into a substantially semicircular shape on the plane (the zy-plane) perpendicular to the axis line direction. While the frame 2 is divided into the plurality of frame parts (for example, the first frame part 21 and the second frame part 22), the support part 21d is an undivided part of the frame 2. The support part 21d includes a support surface 211d facing the compression spring 6 and supporting the compression spring 6 on the load side of the motor 1.

The first frame part 21 includes a first restriction part 21f to restrict a fixing position of the second bearing 4b in the axis line direction. The first restriction part 21f is also referred to as a "base-side restriction part", a "lower-side restriction part", a "base-side protruding part", or a "lower-side protruding part". In the present embodiment, an end part of an outer side (the counter-load-side) of the second bearing 4b touches the first restriction part 21f. However, the second bearing 4b may be positioned in such a manner that the end part of the outer side (the counter-load-side) of the second bearing 4b does not touch the first restriction part 21f.

The second frame part 22 includes a stator fitting part 22a (also referred to as a "second stator fitting part", a "counter-base-side stator fitting part", or an "upper-side stator fitting part") that fits with the stator 3, a bearing fitting part 22b that fits with the first bearing 4a, and a bearing fitting part 22c that fits with the second bearing 4b. In the present embodiment, a portion of the outer peripheral part of the stator 3 (specifically, the stator core 3a on a +z-side with respect to the axis line A0) is fitted to the stator fitting part 22a having a concave shape, the first bearing 4a on the +z-side with respect to the axis line A0 is fitted to the bearing fitting part 22b, and the second bearing 4b on the +z-side with respect to the axis line A0 is fitted to the bearing fitting part 22c.

The second frame part 22 includes a concave part 22d combined with the support part 21d (specifically, the convex part 210d). It is desirable that an outer edge of the concave part 22d have a shape (for example, a substantially semicircular shape) which allows it to be combined with an outer edge of the convex part 210d so that no space is formed between the convex part 210d and the concave part 22d. As illustrated in FIG. 2B, in the present embodiment, in a state in which the first frame part 21 and the second frame part 22 of the frame 2 are fixed to each other, the concave part 22d is combined with the convex part 210d along the outer edge of the convex part 210d. However, a space may be formed between the convex part 210d and the concave part 22d.

The second frame part 22 includes a second restriction part 22f to restrict the fixing position of the second bearing 4b in the axis line direction. The second restriction part 22f is also referred to as a "counter-base-side restriction part", an "upper-side restriction part", a "counter-base-side protruding part", or an "upper-side protruding part". In the present embodiment, an end part of an outer side (the counter-load-side) of the second bearing 4b touches the second restriction part 22f. That is, in the present embodiment, since the end parts of the outer side (the counter-load-side) of the second bearing 4b touches the first restriction part 21f and the second restriction part 22f, the second bearing 4b is positioned.

It is desirable that the first frame part 21 and the second frame part 22 be formed by using a single mold. For example, resin molding or aluminum die casting is suitable for molding the first frame part 21 and the second frame part 22.

The stator 3 includes the stator core 3a and a winding 3b. The stator 3 is fixed inside (to an inner wall of) the frame 2. Specifically, the stator core 3a is fixed to the stator fitting parts 21a and 22a by means of adhesion, press fitting, or the like in such a manner that the stator core 3a faces the rotor 5 across an air gap 8 outside the rotor 5. For example, the stator core 3a is formed by laminating a plurality of electromagnetic steel sheets and firmly fixing them to each other. The shape of the stator core 3a is, for example, a substantially ring shape, and a plurality of teeth are provided at substantially regular intervals on the inner peripheral side of the stator core 3a in the circumferential direction (e.g., in a direction of rotation of the rotor 5). The winding 3b is wound around the individual teeth provided on the stator core 3a with an insulator in between.

The first bearing 4a is held in the first bearing holder 2a. The first bearing 4a is, for example, a rolling bearing. In the present embodiment, the first bearing 4a is loosely fitted to the bearing fitting parts 21b and 22b. The first bearing 4a is movable in the axis line direction in the first bearing holder 2a. It is desirable that a space be formed between an outer peripheral surface of the first bearing 4a and the first bearing holder 2a (specifically, the bearing fitting parts 21b and 22b). However, the outer peripheral surface of the first bearing 4a and the first bearing holder 2a (specifically, the bearing fitting parts 21b and 22b) may touch each other.

The second bearing 4b is held in the second bearing holder 2b. The second bearing 4b is, for example, a rolling bearing. In the present embodiment, the second bearing 4b is loosely fitted to the bearing fitting parts 21c and 22c and is firmly fixed to the second bearing holder 2b by an adhesive 7. That is, in the present embodiment, while the first bearing 4a is not firmly fixed to the first bearing holder 2a (specifically, the bearing fitting parts 21b and 22b), the second bearing 4b is firmly fixed to the second bearing holder 2b (specifically, the bearing fitting parts 21c and 22c).

The rotor 5 includes a shaft 5a as a rotating shaft of the rotor 5 and a permanent magnet 5b. A cross section of the shaft 5a (a surface perpendicular to the x-axis) is, for example, circular-shaped. The rotor 5 (specifically, the shaft 5a) is rotatably supported by the first bearing 4a and the second bearing 4b. The permanent magnet 5b is fixed to the side of the shaft 5a (the outer peripheral surface) by adhesion or the like. The permanent magnet 5b is ring-shaped, for example, and is magnetized to have the predetermined number of poles.

As another example of the rotor 5, a plurality of plate-shaped or semicylindrical magnets that correspond to the predetermined number of poles may be used as the permanent magnet 5b, and a cross section (a surface perpendicular to the x-axis) of a central part (a part facing the stator 3) of the shaft 5a in the axis line direction may be a polygonal cross section that corresponds to the predetermined number of poles.

The compression spring 6 is held between the support part 21d and the first bearing 4a, and an outer end part of the compression spring 6 (a counter-load-side end part) faces the support part 21d so as to be covered with the support part 21d. That is, the counter-load-side end part of the compression spring 6 is whole of a portion facing the support part 21d, of the compression spring 6. It is desirable that the whole of the outer end part of the compression spring 6 (the counter-load-side end part) be supported by the support part 21d. However, the whole of the outer end part of the compression spring 6 (the counter-load-side end part) does not necessarily touch the support surface 211d of the support part 21d.

The compression spring 6 is, for example, a wave washer. Since the compression spring 6 is compressed in the axis line direction by the first bearing 4a and the support part 21d, the compression spring 6 generates a preload in the axis line direction. For example, when a rolling bearing is used as the first bearing 4a and a wave washer is used as the compression spring, it is desirable that the arrangement of the wave washer and the rolling bearing be set in such a manner that the wave washer applies the preload to an outer ring of the rolling bearing.

While the second bearing 4b is firmly fixed to the frame 2, since the first bearing 4a is not firmly fixed to the frame 2, the preload generated by the compression spring 6 is applied to the rotor 5 via the first bearing 4a. In a state in which the compression spring 6 applies the preload to the rotor 5 via the first bearing 4a, the second bearing 4b is fixed to the second bearing holder 2b. That is, the compression spring 6 applies the preload to the first bearing 4a, the second bearing 4b, and the rotor 5 in the axis line direction (the +x-direction).

The present embodiment has been described assuming that the compression spring 6 is used as an example of the preload member. However, as long as the preload member can generate a preload in the axis line direction of the rotor 5, the preload member is not limited to a spring.

Next, variant examples of the motor 1 described above will be described with reference to FIGS. 4 to 7.

Variant Example 1

Figure 4:
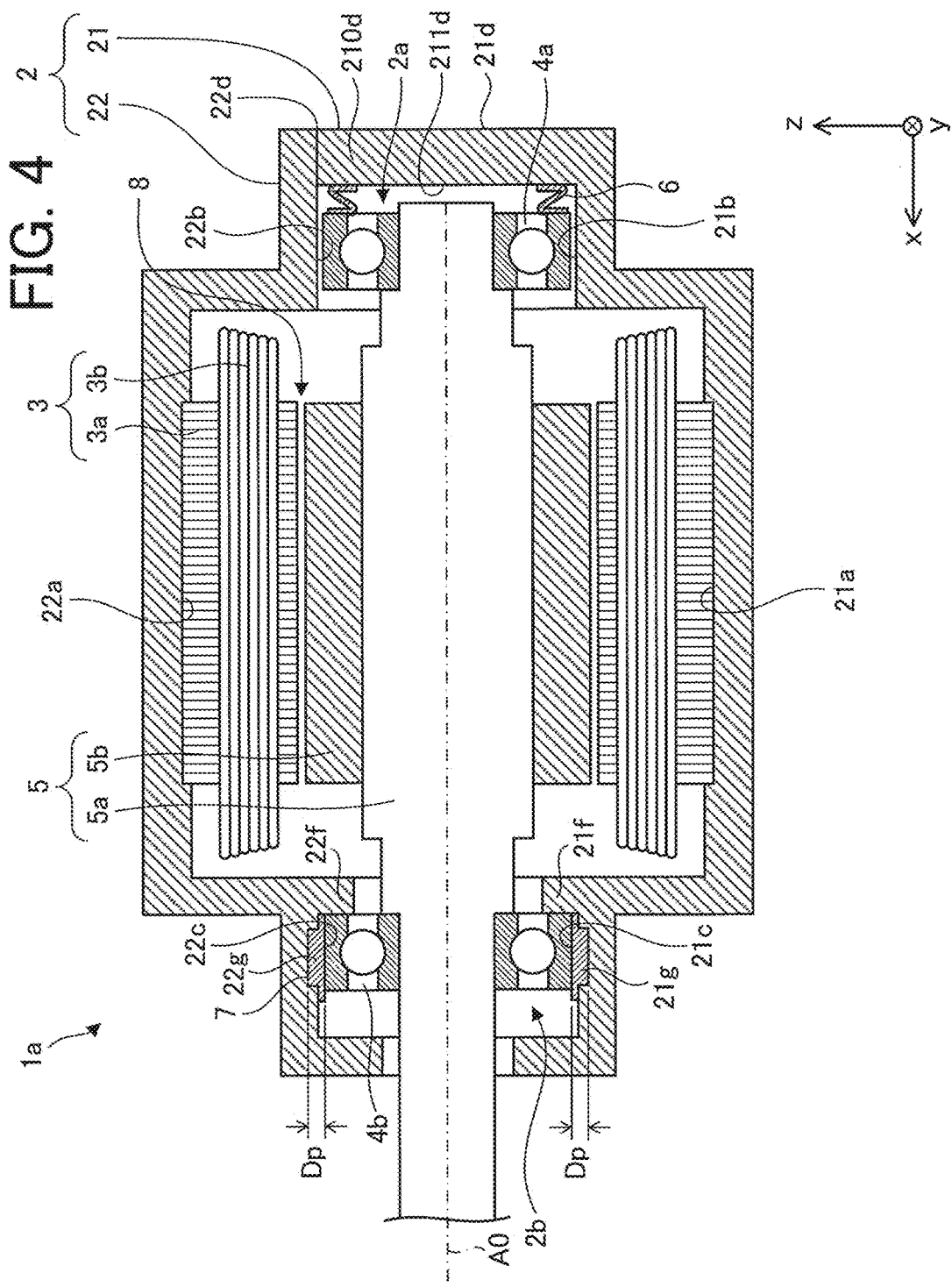
FIG. 4 is a sectional view schematically illustrating another example of the internal structure of the motor.

FIG. 4 is a sectional view schematically illustrating another example of the internal structure of the motor 1.

As illustrated in FIG. 4, the second bearing holder 2b of a motor 1a according to variant example 1 may include depressed parts 21g and 22g at positions where the second bearing holder 2b faces the outer peripheral surface of the second bearing 4b. Specifically, the depressed parts 21g and 22g may be formed on the first frame part 21 and the second frame part 22 (specifically, on the bearing fitting part 21c and the bearing fitting part 22c), respectively. In the example illustrated in FIG. 4, the depressed parts 21g and 22g are filled with the adhesive 7. The second bearing 4b is fixed to the second bearing holder 2b by the adhesive 7 between the depressed parts 21g and 22g and the outer peripheral surface of the second bearing 4b. It is desirable that a thickness Dp of an adhesive layer in a state in which the second bearing 4b is fixed to the first frame part 21 and the second frame part 22 (namely, to the second bearing holder 2b) be set thicker than the thickness needed for the adhesive 7 to exhibit its adhesive strength.

Variant Example 2

FIG. 5 is a sectional view schematically illustrating still another another example of the internal structure of the motor 1.

Figure 6A:
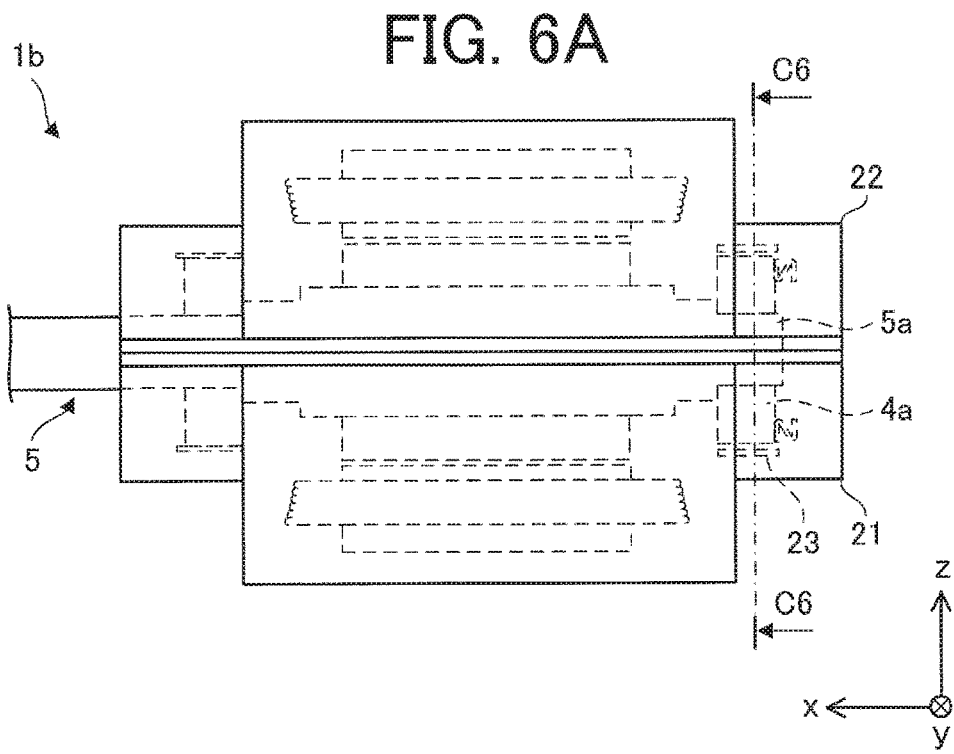
FIG. 6A is a front view schematically illustrating an external appearance of the motor illustrated in FIG. 5.

FIG. 6A is a front view schematically illustrating an external appearance of a motor 1b illustrated in FIG. 5. Portions indicated by dashed lines in FIG. 6A correspond to the internal structure of the motor 1b illustrated in FIG. 5.

Figure 6B:
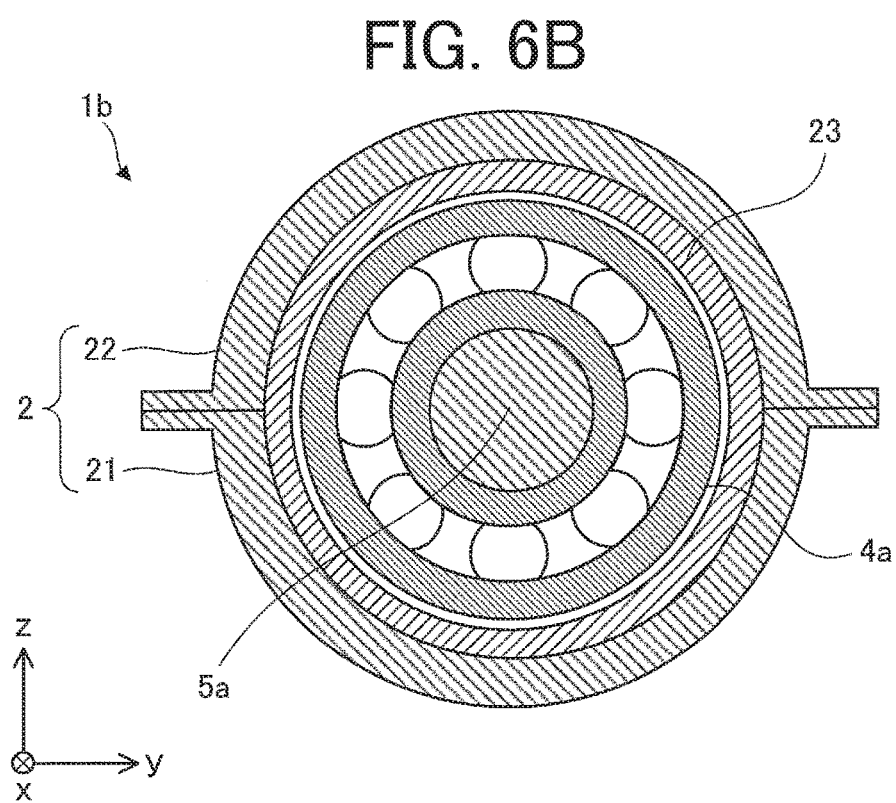
FIG. 6B is a sectional view schematically illustrating a sectional structure taken along line C6-C6 of the motor illustrated in FIG. 6A.

FIG. 6B is a sectional view schematically illustrating a sectional structure taken along line C6-C6 of the motor 1b illustrated in FIG. 6A.

A first bearing holder 2a of the motor 1b according to variant example 2 may include a ring 23 having an inner peripheral surface facing the outer peripheral surface of the first bearing 4a. In other words, the ring 23 may be disposed between the outer peripheral surface of the first bearing 4a and the frame 2 (the first frame part 21 and the second frame part 22). It is desirable that the ring 23 be not divided in the circumferential direction so that the distance between the outer peripheral surface of the first bearing 4a and the frame 2 (the first frame part 21 and the second frame part 22) is made uniform in the circumferential direction. In the example illustrated in FIG. 5, while a space is formed between the outer peripheral surface of the first bearing 4a and the inner peripheral surface of the ring 23, the outer peripheral surface of the first bearing 4a may touch the inner peripheral surface of the ring 23a. While the main material of the ring 23 is not particularly limited, it is desirable to be a material having higher wear resistance than that of the frame 2.

Variant Example 3

Figure 7:
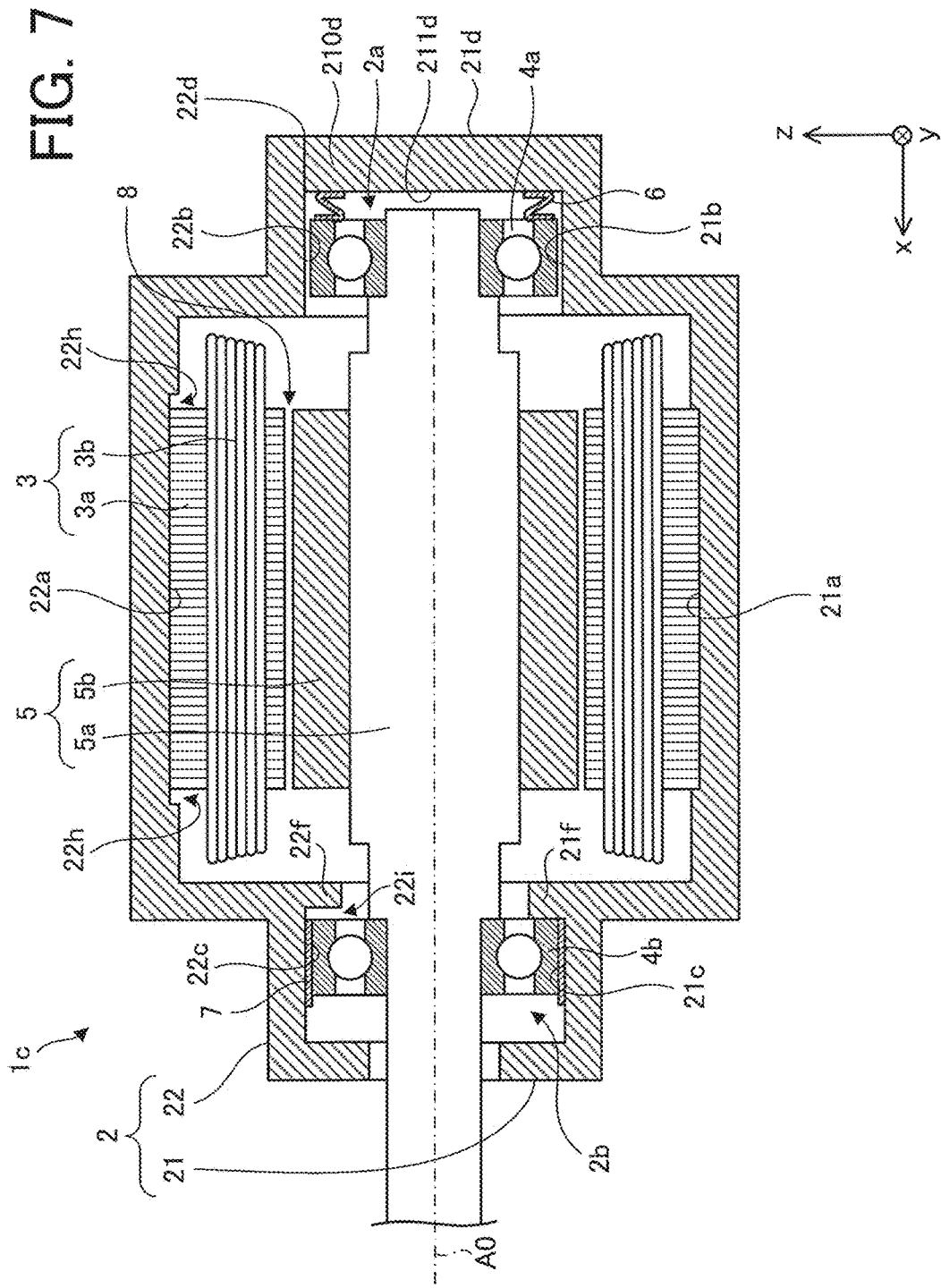
FIG. 7 is a sectional view schematically illustrating still another example of the internal structure of the motor.

FIG. 7 is a sectional view schematically illustrating still another another example of the internal structure of the motor 1.

As illustrated in FIG. 7, the second bearing 4b of a motor 1c according to variant example 3 may be apart from the second restriction part 22f. That is, it is desirable that, in the second bearing holder 2b, a space 22i be formed between the second bearing 4b and the second frame part 22 in the axis line direction (on the counter-load side of the second bearing 4b). In other words, it is desirable that the bearing fitting part 22c of the second frame part 22 be formed so as to be larger than the bearing fitting part 21c of the first frame part 21 in the axis line direction. Likewise, it is desirable that the bearing fitting part 22b of the second frame part 22 be formed so as to be larger than the bearing fitting part 21b of the first frame part 21 in the axis line direction.

As illustrated in FIG. 7, in the motor 1c according to variant example 3, the width of a stator fitting part 22a in the axis line direction may be larger than that of a stator fitting part 21a in the axis line direction. That is, it is desirable that, in the stator fitting part 22a, spaces 22h be formed between a stator core 3a and the second frame part 22 (the inner wall of the stator fitting part 22a) in the axis line direction.

The motor 1 according to the present embodiment and the motors 1a to 1c according to the variant examples described above are applicable to various purposes. For example, these motors are applicable to refrigerators, air conditioners, and the like.

The features in the embodiment and the variant examples described above can be combined with each other as appropriate.

In the motor 1 according to the present embodiment, the compression spring 6 applies the preload to the rotor 5 via the first bearing 4a. In this case, for example, when the support part that supports the compression spring was divided into a plurality of parts, it is sometimes not possible to obtain appropriate concentricity of the rotor with respect to the stator, depending on the assembly accuracy of the frame or the processing accuracy of the connection part (the division surface) of each of the parts into which the support part is divided. However, in the motor 1 according to the present embodiment, since the outer end part of the compression spring 6 (the counter-load-side end part) faces the support part 21d so as to be covered with the support part 21d (that is, the support part 21d is not divided) and since this support part 21d supports the compression spring 6, the concentricity of the rotor 5 with respect to the stator 3 can be improved. In other words, since the support part 21d includes the convex part 210d protruding toward the second frame part 22 and since the support part 21d, which is not divided into a plurality of parts, supports the compression spring 6, the position of the compression spring 6 can be maintained in such a manner that the direction of the preload applied to the rotor 5 via the first bearing 4a is parallel to the axis line direction. Thus, it is possible to maintain the state in which the concentricity of the rotor 5 with respect to the stator 3 is improved.

Since the second frame part 22 includes the concave part 22d combined with the convex part 210d, the sealing property of the frame 2 on the counter-load side of the motor 1 can be ensured.

In addition, while the second bearing 4b is fixed in the axis line direction in the second bearing holder 2b, the first bearing 4a is movable in the axis line direction in the first bearing holder 2a (that is, the first bearing 4a is not fixed in the axis line direction). Accordingly, the expansion difference between the frame 2 and the rotor 5 (specifically, the shaft 5a) can be absorbed, stress imposed on the first bearing 4a and the second bearing 4b can be reduced, and therefore it is possible to prevent the first bearing 4a and the second bearing 4b from malfunctioning. In addition, since the preload in the axis line direction (the +x-direction) can be applied to the rotor 5 by fixing the second bearing 4b in the axis line direction and by making the first bearing 4a movable in the axis line direction, an abnormal noise caused by vibration in the axis line direction of the rotor 5, resonance, and the like can be reduced.

Since the first frame part 21 and the second frame part 22 include the first restriction part 21f and the second restriction part 22f, respectively, the movement or the fixing position of the second bearing 4b in the axis line direction can be restricted. For example, since the first restriction part 21f touches the outer (the counter-load-side) end part of the second bearing 4b, an abnormal noise caused by vibration in the axis line direction of the rotor 5, resonance, and the like can be reduced.

Since the first frame part 21 is formed by molding with a single mold, the concentricity between the stator 3 and the rotor 5 that are supported by the corresponding fitting parts (for example, the stator fitting part 21a and the bearing fitting parts 21b and 21c) of the first frame part 21 can be improved. Likewise, since the second frame part 22 is formed by molding with a single mold, the concentricity between the stator 3 and the rotor 5 that are supported by the corresponding fitting parts (for example, the stator fitting part 22a and the bearing fitting parts 22b and 22c) of the second frame part 22 can be improved.

In the motor 1a according to variant example 1, since the second bearing holder 2b includes the depressed parts 21g and 22g at the positions where the the second bearing holder 2b faces the outer peripheral surface of the second bearing 4b, the thickness Dp of the adhesive layer needed for the adhesive 7 to exhibit its adhesive strength can be ensured. In addition, variations of the fixing position of the second bearing 4b in a radial direction (the z-direction) due to variations of the thickness Dp of the adhesive layer can be reduced.

In the motor 1b according to variant example 2, since the first bearing holder 2a includes the ring 23 having an inner peripheral surface facing the outer peripheral surface of the first bearing 4a, the space between the outer peripheral surface of the first bearing 4a and the frame 2 can uniformly be reduced. Thus, a malfunction of the motor 1 caused by creep can be prevented.

In the motor 1c according to variant example 3, when the second bearing 4b is fixed to the second bearing holder 2b in such a manner that the second bearing 4b is apart from the second restriction part 22f, a positional deviation between the first frame part 21 and the second frame part 22 in the axis line direction (for example, a positional deviation between the position of the bearing fitting part 21b and the position of the bearing fitting part 22b in the axis line direction, a positional deviation between the position of the bearing fitting part 21c and the position of the bearing fitting part 22c in the axis line direction, or a positional deviation between the position of the stator fitting part 21a and the position of the stator fitting part 22a in the axis line direction) can be absorbed. Likewise, when the width of the stator fitting part 22a in the axis line direction is formed wider than the width of the stator fitting part 21a in the axis line direction, a positional deviation between the first frame part 21 and the second frame part 22 in the axis line direction can be absorbed. In the present application, the "positional deviation" includes both a positional deviation (a processing error) of processing positions of the stator fitting parts 21a and 22a which occurs in the process of producing the first frame part 21 and the second frame part 22 (caused by the accuracy of the mold shape and shrinkage of the material after molding), and a relative positional deviation (an assembling error) that occurs when the first frame part 21 and the second frame part 22 are combined with each other.

Next, a method for producing the motor 1 according to the present embodiment will be described.

First, as a preparation step before assembling the components of the motor 1, the frame 2 is formed by using a mold. For example, the frame 2 includes the first frame part 21 and the second frame part 22, and the frame 2 is formed so that its shape is a cylindrical shape with a bottom when these components are combined. It is desirable that the first frame part 21 and the second frame part 22 be formed in such a manner that their respective connection surfaces to be combined with each other (except the connection surfaces of the convex part 210d and the concave part 22d) include the axis line A0 of the rotor 5.

The support part 21d (the bottom part) that faces and covers the outer end part (the counter-load-side end part) of the compression spring 6 is formed on the first frame part 21 on the counter-load side of the motor 1. The support surface 211d that faces and supports the compression spring 6 is formed on the support part 21d. It is desirable that the support surface 211d be formed so as to support the whole of the outer end part (the counter-load-side end part) of the compression spring 6. In addition, the support part 21d is formed into a substantially circular shape on a plane (the zy-plane) perpendicular to the axis line direction and is formed to include the convex part 210d that protrudes toward the second frame part 22. The convex part 210d is formed into a substantially semicircular shape on the plane (the zy-plane) perpendicular to the axis line direction. In addition, on the first frame part 21, the plurality of fitting parts (for example, the stator fitting part 21a and the bearing fitting parts 21b and 21c) to which the stator 3, the first bearing 4a, and the second bearing 4b are to be fitted are formed.

On the second frame part 22, the concave part 22d with which the support part 21d (specifically, the convex part 210d) of the first frame part 21 is to be combined is formed. In addition, on the second frame part 22, the plurality of fitting parts (for example, the stator fitting part 22a and the bearing fitting parts 22b and 22c) to which the stator 3, the first bearing 4a, and the second bearing 4b are to be fitted are formed.

Figure 8:
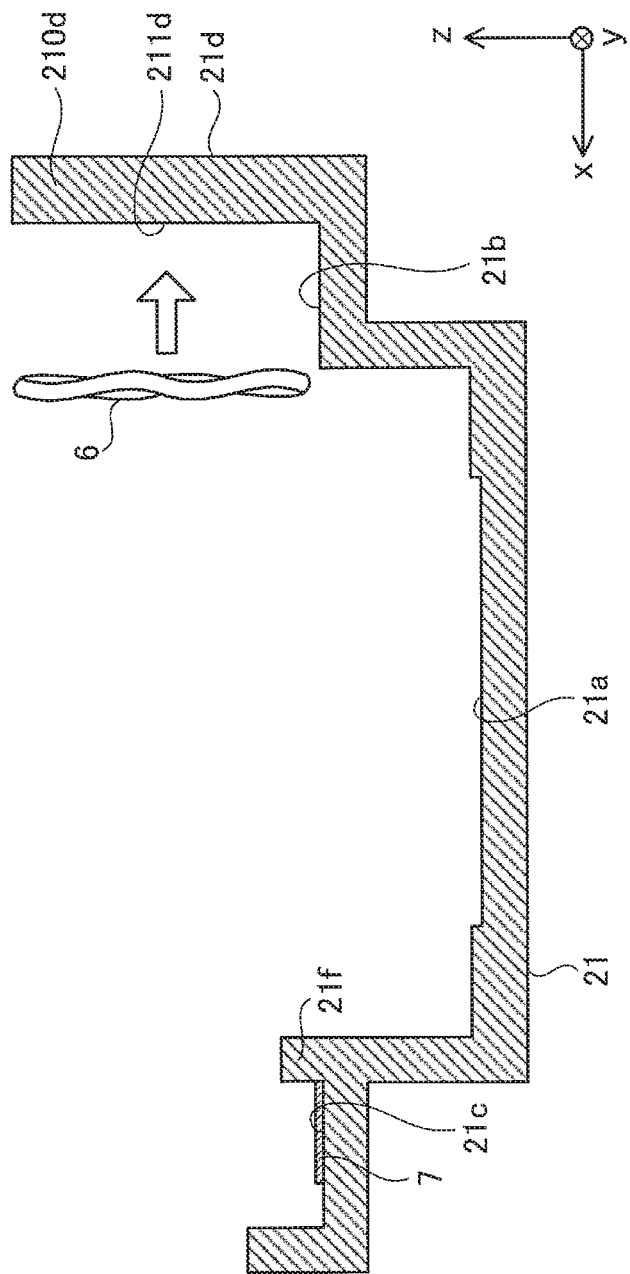
FIG. 8 is a diagram schematically illustrating a step of disposing a compression spring on a support part of a first frame part.

FIG. 8 is a diagram schematically illustrating a step (a preload member disposition step) of disposing the compression spring 6 on the support part 21d of the first frame part 21. For example, the compression spring 6 is a wave washer.

As illustrated in FIG. 8, the compression spring 6 is disposed on the support part 21d in such a manner that the outer end part (the counter-load-side end part) of the compression spring 6 faces the support part 21d (specifically, the support surface 211d). For example, the compression spring 6 may be firmly fixed to the support surface 211d by an adhesive or the like.

Figure 9:
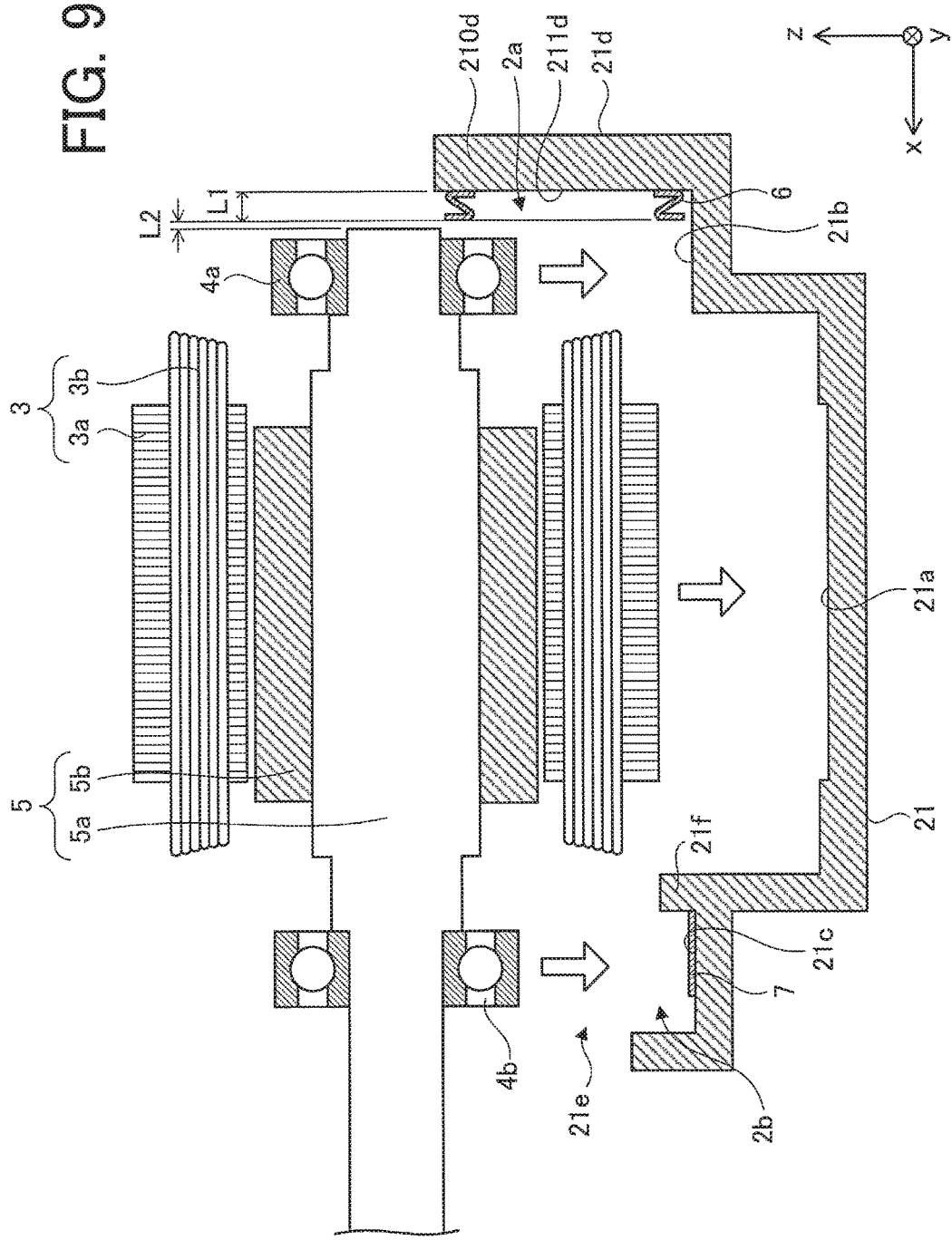
FIG. 9 is a sectional view schematically illustrating a step of disposing a stator and a first bearing and a second bearing, into which a rotor is inserted, in the first frame part.

FIG. 9 is a sectional view schematically illustrating a step (a bearing disposition process) of disposing the stator 3 and the first bearing 4a and the second bearing 4b, into which the rotor 5 is inserted, in the first frame part 21.

First, the adhesive 7 is applied to the bearing fitting part 21c of the first frame part 21. The compression spring 6 is in a state of being disposed on the support part 21d and is in a state in which its length is a free length (a natural length) of L1 (that is, in a no-load state).

Next, in the state that the length of the compression spring 6 is the free length and a space of length L2 is provided between the shaft 5a of the rotor 5 and the compression spring 6, the stator 3 and the first bearing 4a and the second bearing 4b into which the rotor 5 is inserted are inserted into the inside of the first frame part 21 through an opening 21e of the first frame part 21. At the time, the stator 3 is fixed to the first frame part 21, and the first bearing 4a and the second bearing 4b into which the rotor 5 is inserted are disposed in the first bearing holder 2a and the second bearing holder 2b, respectively.

Specifically, the stator core 3a on the insertion side (the −z-side) is fixed to the stator fitting part 21a by adhesion, press fitting, or the like. In addition, the first bearing 4a and the second bearing 4b are loosely fitted in the first bearing holder 2a (specifically, the bearing fitting part 21b) and the second bearing holder 2b (specifically, the bearing fitting part 21c), respectively. The first bearing 4a is loosely fitted to the bearing fitting part 21b. The space (the space having the length L2) formed between the shaft 5a and the compression spring 6 when the first bearing 4a and the second bearing 4b are inserted into the first frame part 21 may be set to have a length such that the first bearing 4a and the rotor 5 do not touch the compression spring 6.

Next, with reference to FIGS. 10 and 11, a step (a bearing fixing step) of fixing the second bearing 4b to the second bearing holder 2b in a state in which the rotor 5 presses the compression spring 6 in the axis line direction (the −x-direction) via the first bearing 4a will be described.

Figure 10:
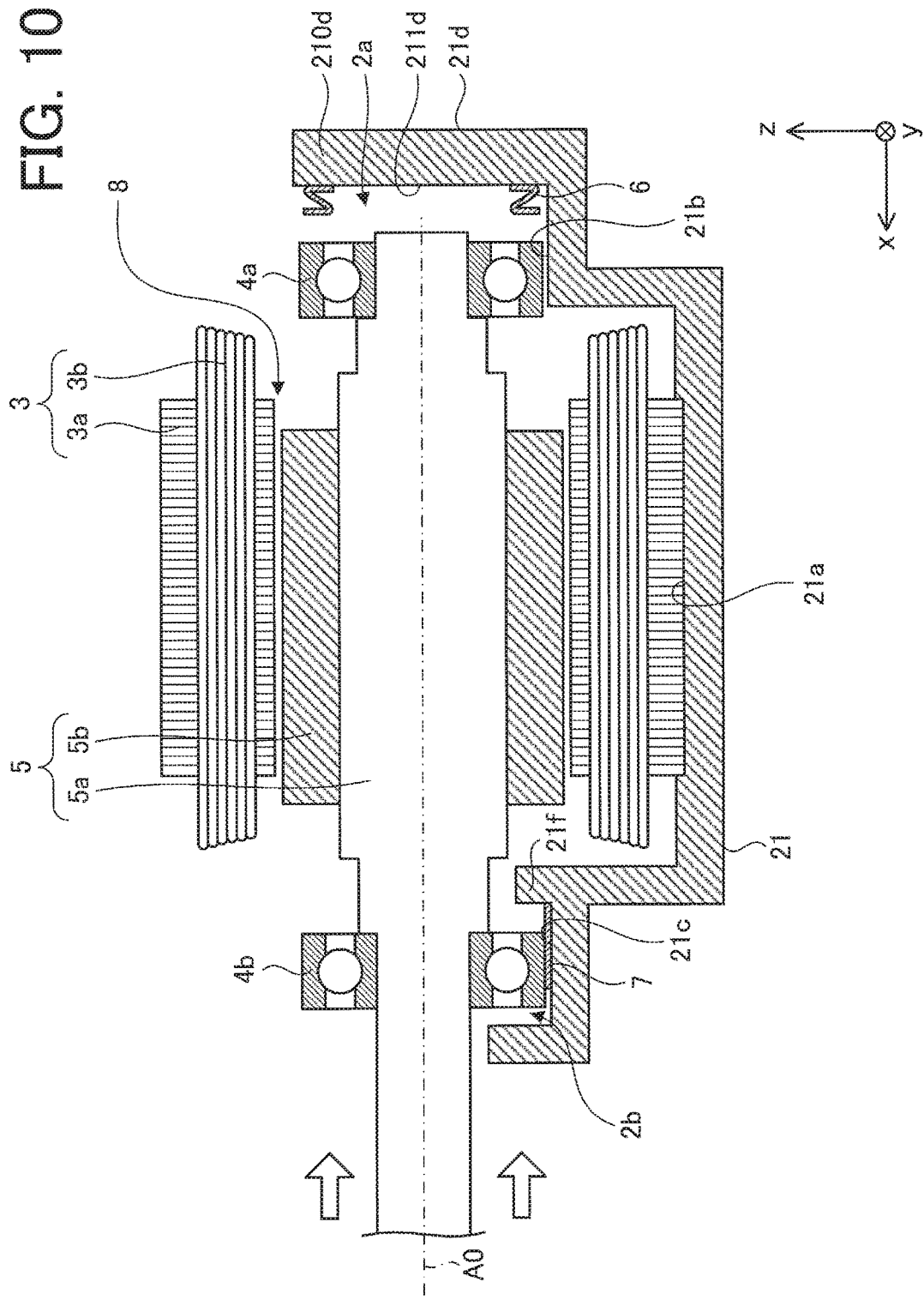
FIG. 10 is a sectional view schematically illustrating a step of compressing the compression spring by moving the rotor.

FIG. 10 is a sectional view schematically illustrating a step (a preload member compression step) of compressing the compression spring 6 by moving the rotor 5.

Figure 11:
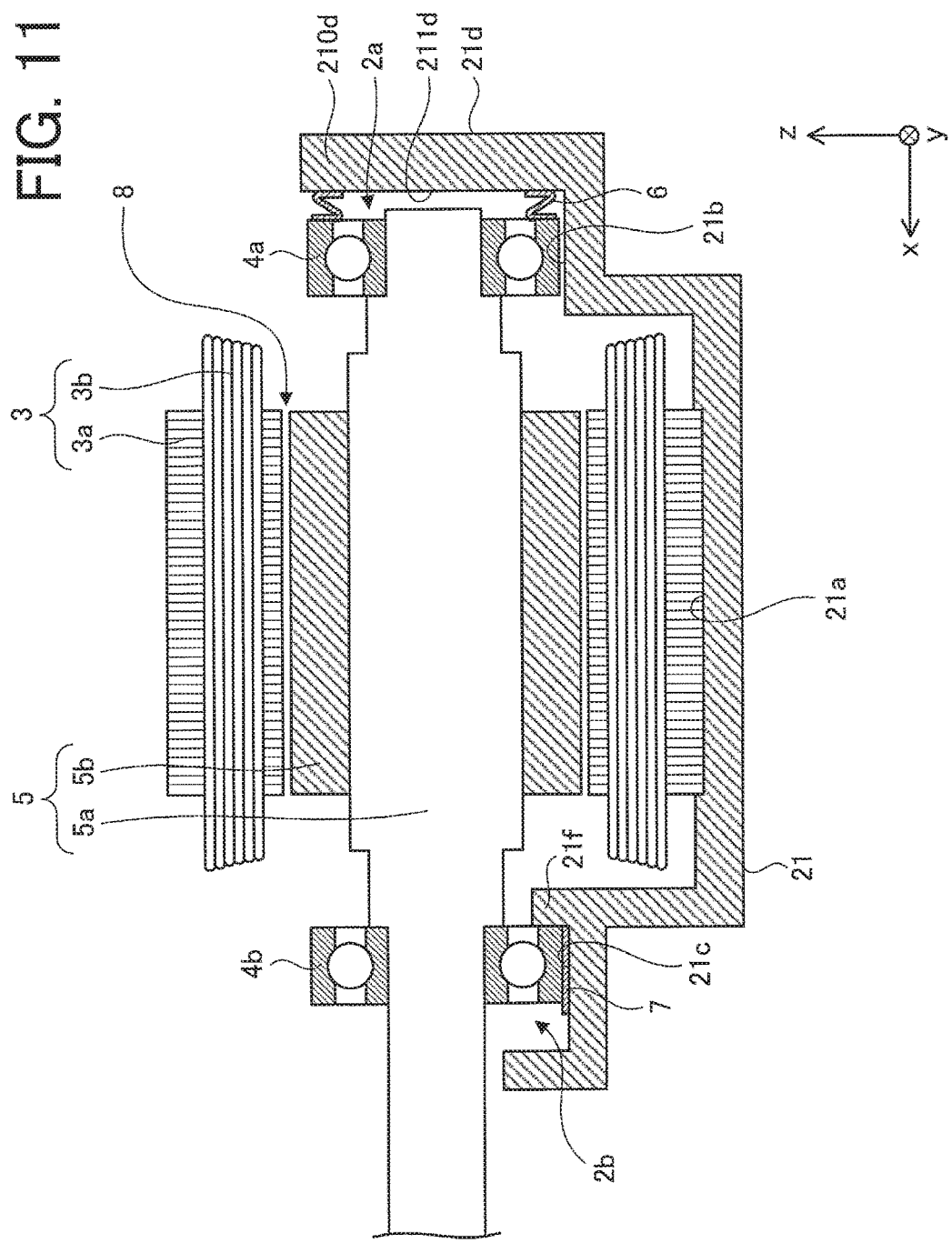
FIG. 11 is a sectional view schematically illustrating a step of determining a fixing position of the second bearing in a state in which the compression spring is compressed.

FIG. 11 is a sectional view schematically illustrating a step (a bearing positioning step) of determining the fixing position of the second bearing 4b in a state in which the compression spring 6 is compressed.

That is, the bearing fixing step includes the preload member compression step and the bearing positioning step.

First, in the state (the state illustrated in FIG. 10) in which the rotor 5 is inserted in the first frame part 21 by performing the bearing disposition step, by moving the rotor 5, together with the first bearing 4a and the second bearing 4b, in the counter-load-side direction (the −x-direction), the compression spring 6 is pressed in the counter-load-side direction via the first bearing 4a. In other words, by pressing the rotor 5 in the counter-load-side direction, the compression spring 6 is sandwiched between the first bearing 4a and the support part 21d so that the compression spring 6 is compressed therebetween.

Next, in the state in which the compression spring 6 is compressed (in the state in which the rotor 5 presses the compression spring 6 in the counter-load-side direction via the first bearing 4a), the fixing position of the second bearing 4b in the axis line direction is determined. In the present embodiment, the fixing position of the second bearing 4b is a position where the outer end part of the second bearing 4b (the counter-load-side end part) touches the first restriction part 21f. As illustrated in FIG. 11, in the state in which the compression spring 6 is compressed, the adhesive 7 applied to the bearing fitting part 21c is hardened. By hardening the adhesive 7 applied to the bearing fitting part 21c, the second bearing 4b is firmly fixed to the second bearing holder 2b (specifically, the bearing fitting part 21c), and the position of the second bearing 4b is fixed. In the state in which the second bearing 4b is fixed to the second bearing holder 2b (specifically, the bearing fitting part 21c), the compression spring 6 applies the preload to the first bearing 4a, to the rotor 5 (specifically, the shaft 5a) via the first bearing 4a, and to the second bearing 4b via the first bearing 4a and the rotor 5.

Figure 12:
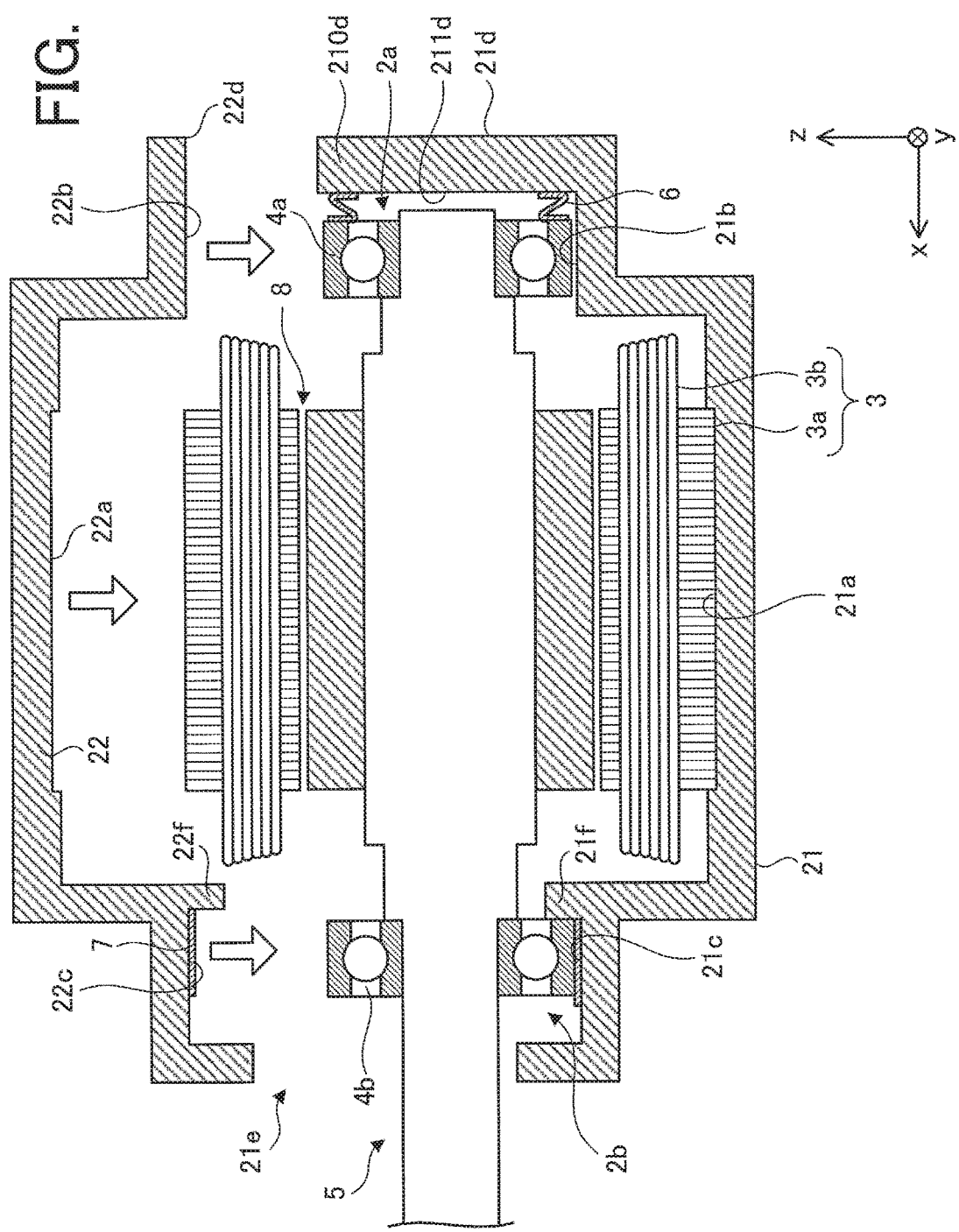
FIG. 12 is a sectional view schematically illustrating a step of fixing a second frame part to the first frame part.

FIG. 12 is a sectional view schematically illustrating a step (a frame fixing step) of fixing the second frame part 22 to the first frame part 21.

Figure 13:
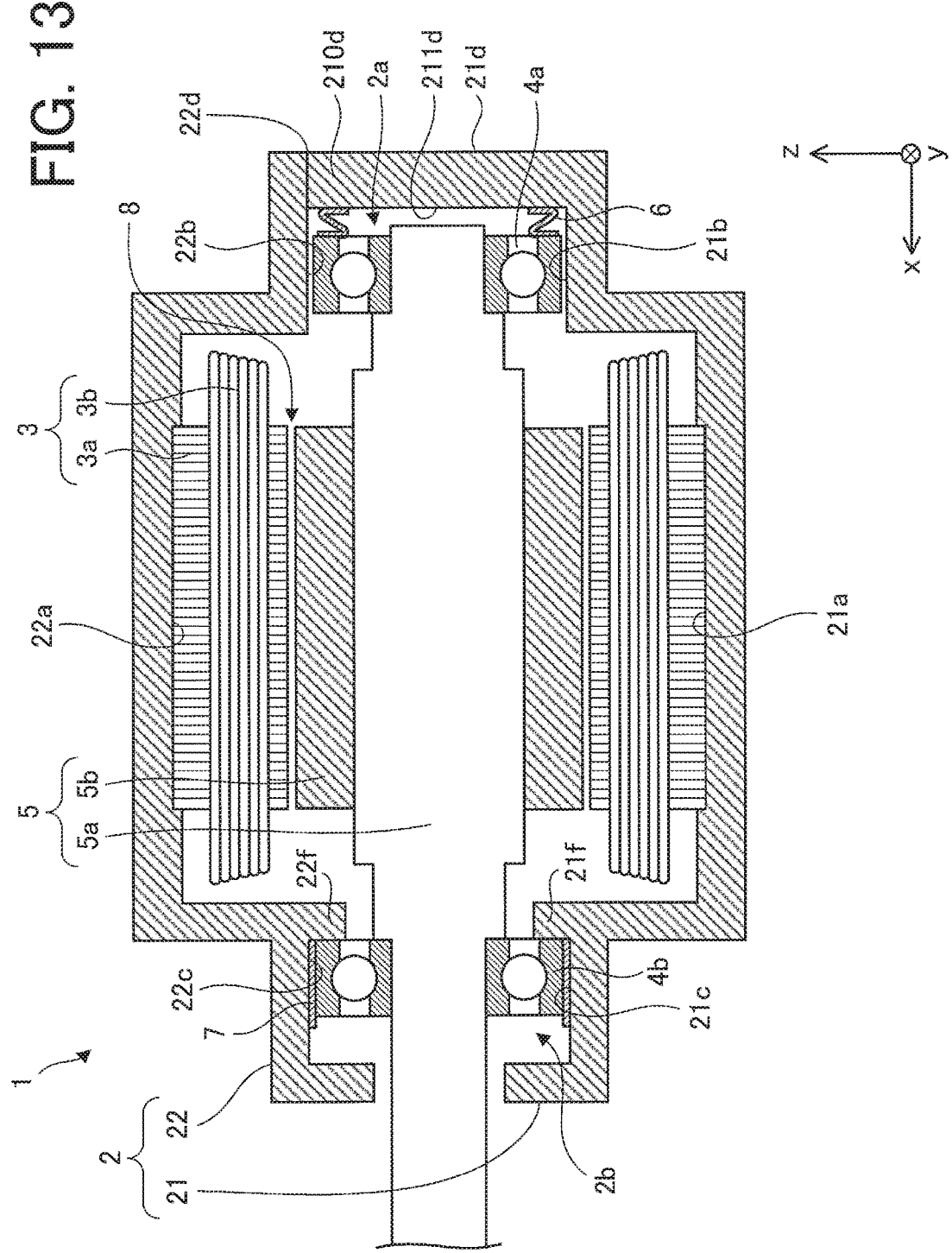
FIG. 13 is a sectional view schematically illustrating a state in which the second frame part is fixed to the first frame part.

FIG. 13 is a sectional view schematically illustrating a state in which the second frame part 22 is fixed to the first frame part 21.

As illustrated in FIG. 12, the adhesive 7 is applied to the bearing fitting part 22c of the second frame part 22, and then the second frame part 22 is placed on the upper portion (on the +z-side) of the first frame part 21 in such a manner that the opening 21e of the first frame part 21 is covered by the second frame part 22. When the second frame part 22 is placed on the upper portion of the first frame part 21, the first bearing 4a is loosely fitted to the bearing fitting part 22b of the second frame part 22, the second bearing 4b is loosely fitted to the bearing fitting part 22c of the second frame part 22, and the stator core 3a is fixed to the stator fitting part 22a by adhesion, press fitting, or the like.

As illustrated in FIG. 13, in a state in which the second bearing 4b is fitted to the bearing fitting part 22c, by hardening the adhesive 7 applied to the bearing fitting part 22c, the second bearing 4b is firmly fixed to the second frame part 22 (specifically, to the bearing fitting part 22c). Finally, the first frame part 21 and the second frame part 22 are fixed to each other by adhesion, screw fastening, welding, or the like.

Through the steps described above, the motor 1 according to the present embodiment can be produced. The method for producing the motor 1 described above is also applicable to producing the motors according to variant examples 1 to 3. However, the method for producing the motor 1 is not limited to the method described above.

For example, when the motor 1a (FIG. 4) according to variant example 1 is produced, the depressed parts 21g and 22g may be formed on the first frame part 21 (specifically, the bearing fitting part 21c) and the second frame part 22 (the bearing fitting part 22c), respectively, by using a mold. In this case, it is desirable that the depressed parts 21g and 22g be filled with the adhesive 7 so as to fix the second bearing 4b firmly to the first frame part 21 and the second frame part 22. It is desirable that the thickness Dp of the adhesive layer in the state in which the second bearing 4b is firmly fixed to the first frame part 21 and the second frame part 22 be set thicker than the thickness needed for the adhesive 7 to exhibit its adhesive strength.

In addition, for example, when the motor 1b (FIG. 5) according to variant example 2 is produced, the ring 23 may be disposed between the first bearing 4a (specifically, the outer peripheral surface of the first bearing 4a) and the frame 2 (the first frame part 21 and the second frame part 22).

In addition, for example, when the motor 1c (FIG. 7) according to variant example 3 is produced, the second frame part 22 may be molded by using a mold in such a manner that the second bearing 4b is apart from the second restriction part 22f. That is, the second frame part 22 may be molded in such a manner that the space 22i is formed between the second bearing 4b and the second frame part 22 in the axis line direction (on the counter-load side of the second bearing 4b) in the second bearing holder 2b. In other words, the second frame part 22 may be molded in such a manner that the bearing fitting part 22c of the second frame part 22 is larger than the bearing fitting part 21c of the first frame part 21 in the axis direction. Likewise, the second frame part 22 may be molded in such a manner that the bearing fitting part 22b of the second frame part 22 is larger than the bearing fitting part 21b of the first frame part 21 in the axis line direction.

In addition, for example, when the motor 1c (FIG. 7) according to variant example 3 is produced, the second frame part 22 may be molded by using a mold in such a manner that the width of the stator fitting part 22a of the second frame part 22 in the axis line direction is larger than that of the stator fitting part 21a of the first frame part 21 in the axis line direction. In other words, the second frame part 22 may be molded in such a manner that the space 22g and the space 22h are formed in the stator fitting part 22a between the stator core 3a and the second frame part 22 (the inner wall of the stator fitting part 22a) in the axis line direction.

According to the method for producing the motor 1 according to the present embodiment, the first frame part 21 includes the support part 21d that covers the outer end part of the compression spring 6 in the axis line direction and supports the outer end part of the compression spring 6. Therefore, in a state in which the rotor 5 is disposed in the first frame part 21, by moving the rotor 5 in the counter-load-side direction (the −x-direction), the compression spring 6 is pressed in the counter-load-side direction via the first bearing 4a, the compression spring 6 is sandwiched between the first bearing 4a and the support part 21d, and thus the compression spring 6 can be compressed. Thus, even in a state before the compression spring 6 disposed in the first frame part 21 is compressed (a natural length state), the compression spring 6, the rotor 5, the first bearing 4a, and the second bearing 4b can easily be disposed in the first frame part 21. In addition, since the compression spring 6 can be compressed in a state in which the rotor 5 is disposed in the first frame part 21, by moving the rotor 5 in the axis line direction, the motor 1 including the rotor 5 having high concentricity with respect to the stator 3 can be produced easily.

Since the stator fitting part 21a and the bearing fitting parts 21b and 21c are formed on the first frame part 21, which is a single part, by using a single mold, for example, compared with a case in which each of the fitting parts is individually formed by cutting, it is possible to improve the concentricity between the stator 3 and the rotor 5 supported by the corresponding fitting parts formed on the first frame part 21. Likewise, since the stator fitting part 22*a* and the bearing fitting parts 22*b* and 22*c* are formed on the second frame part 22, which is a single part, by using a single mold, for example, compared with a case in which each of the fitting parts is individually formed by cutting, it is possible to improve the concentricity between the stator 3 and the rotor 5 supported by the corresponding fitting parts formed on the second frame part 22.

When the first bearing 4*a* and the second bearing 4*b*, into which the rotor 5 is inserted, are disposed in the first frame part 21, the first bearing 4*a* is loosely fitted to the bearing fitting part 21*b*. Accordingly, in a state in which the rotor 5 is disposed in the first frame part 21, it is possible to determine the fixing position of the second bearing 4*b* in the axis line direction, through an operation to move the rotor 5 in the counter-load-side direction (the −x-direction) together with the first bearing 4*a* and the second bearing 4*b*. Thus, it is possible to easily perform compression of the compression spring 6 and fixing of the second bearing 4*b*, compared with a method for positioning only through operation to insert the first bearing 4*a* and the second bearing 4*b*, into which the rotor 5 is inserted, from the outside into the inside of the first frame part 21 (an inserting operation in the −z-direction), for example.

When the depressed parts 21*g* and 22*g* are formed on the first frame part 21 (specifically, the bearing fitting part 21*c*) and the second frame part 22 (specifically, the bearing fitting part 22*c*), respectively, variations of the fixing position of the second bearing 4*b* in the radial direction (the z-direction) can be reduced. Specifically, by forming the depressed parts 21*g* and 22*g*, the thickness Dp of the adhesive layer needed for the adhesive 7 to exhibit its adhesive strength can sufficiently be provided, and variations of the fixing position of the second bearing 4*b* in the radial direction (the z-direction) caused by the variations of the thicknesses of the adhesive layer can be reduced.

When the ring 23 is disposed between the first bearing 4*a* (specifically, the outer peripheral surface of the first bearing 4*a*) and the frame 2 (the first frame part 21 and the second frame part 22), the space between the outer peripheral surface of the first bearing 4*a* and the frame 2 can be uniformly reduced, and thus, the motor 1 that suppresses occurrence of creep can be produced.

When the second frame part 22 is molded in such a manner that the second bearing 4*b* is apart from the second restriction part 22*f*, it is possible to absorb an assembling error caused by a positional deviation between the first frame part 21 and the second frame part 22 in the axis line direction at the time of production, or the like (for example, a positional deviation between the position of the bearing fitting part 21*b* and the position of the bearing fitting part 22*b* in the axis line direction, a positional deviation between the position of the bearing fitting part 21*c* and the position of the bearing fitting part 22*c* in the axis line direction, or a positional deviation between the position of the stator fitting part 21*a* and the position of the stator fitting part 22*a* in the axis line direction). Likewise, when the first frame part 21 and the second frame part 22 are molded in such a manner that the width of the stator fitting part 22*a* in the axis line direction is larger than that of the stator fitting part 21*a* in the axis line direction, it is possible to absorb an assembling error caused by a positional deviation between the first frame part 21 and the second frame part 22 in the axis line direction at the time of production, or the like.

What is claimed is:

1. A motor comprising:
   a frame including a first bearing holder;
   a stator fixed to the frame;
   a first bearing held in the first bearing holder;
   a rotor rotatably supported by the first bearing; and
   a preload member generating a preload in a direction of an axis line of the rotor, wherein
   the frame further includes a first frame part and a second frame part,
   the first frame part includes a support part supporting the preload member,
   an outer end part of the preload member faces the support part so as to be covered with the support part, and
   the second frame part includes a concave part combined with the support part.

2. The motor according to claim 1, further comprising a second bearing rotatably supporting the rotor, wherein
   the frame further includes a second bearing holder holding the second bearing, and
   the second bearing is fixed to the second bearing holder in a state in which the preload member applies the preload to the rotor via the first bearing.

3. The motor according to claim 2, wherein the second bearing holder includes a depressed part at a position where the second bearing holder faces an outer peripheral surface of the second bearing, and
   the second bearing is fixed to the second bearing holder by an adhesive between the depressed part and the outer peripheral surface of the second bearing.

4. The motor according to claim 2, wherein the first frame part includes a first restriction part to restrict a fixing position of the second bearing in the direction of the axis line.

5. The motor according to claim 2, wherein
   the second frame part includes a second restriction part to restrict a fixing position of the second bearing in the direction of the axis line, and
   the second bearing is apart from the second restriction part.

6. The motor according to claim 1, wherein
   the support part includes a convex part protruding toward the second frame part.

7. The motor according to claim 6, wherein the concave part is combined with the convex part.

8. The motor according to claim 6, wherein the first frame part includes a first stator fitting part into which a portion of an outer peripheral part of the stator is fitted, and
   the second frame part includes a second stator fitting part into which another portion of the outer peripheral part of the stator is fitted.

9. The motor according to claim 8, wherein a width of the second stator fitting part in the direction of the axis line is larger than a width of the first stator fitting part in the direction of the axis line.

10. The motor according to claim 1, wherein the outer end part is whole of a portion facing the support part, of the preload member.

11. The motor according to claim 1, wherein the preload member is a compression spring, and
    the compression spring is compressed by the first bearing and the support part.

12. The motor according to claim 1, wherein the first bearing is movable in the direction of the axis line in the first bearing holder.

13. The motor according to claim 1, wherein the first bearing holder includes a ring having an inner peripheral surface facing an outer peripheral surface of the first bearing.

14. A method for producing a motor including a stator, first and second bearings, a frame including first and second bearing holders holding the first and second bearings respectively, a rotor rotatably supported by the first and second bearings, and a preload member generating a preload in a direction of an axis line of the rotor, the frame including first and second frame parts, the first frame part including a support part facing an outer end part of the preload member so as to cover the outer end part of the preload member and thus supporting the outer end part of the preload member, comprising the steps of:

disposing the preload member on the support part of the first frame part;

fixing the stator to the first frame part and disposing the first and second bearings into which the rotor is inserted in the first and second bearing holders, respectively;

fixing the second bearing to the second bearing holder in a state in which the rotor presses the preload member in the direction of the axis line via the first bearing; and combining a concave part of the second frame part with the support part.

* * * * *